(12) United States Patent
Sierra (10) Patent No.: US 9,194,513 B2
(45) Date of Patent: Nov. 24, 2015

(54) EXHAUST SUBSYSTEM WITH POLYMER HOUSING

(76) Inventor: Baljit Sierra, Richmond Hill (CA)

(*) Notice: Subject to any disclaimer, the term of this patent is extended or adjusted under 35 U.S.C. 154(b) by 315 days.

(21) Appl. No.: 13/636,962

(22) PCT Filed: Mar. 23, 2010

(86) PCT No.: PCT/CA2010/000403
§ 371 (c)(1),
(2), (4) Date: Jan. 29, 2013

(87) PCT Pub. No.: WO2011/116447
PCT Pub. Date: Sep. 29, 2011

(65) Prior Publication Data
US 2013/0126034 A1  May 23, 2013

(51) Int. Cl.
*F16L 9/14* (2006.01)
*F01N 1/24* (2006.01)
*F01N 13/00* (2010.01)
*F01N 13/16* (2010.01)

(52) U.S. Cl.
CPC ... *F16L 9/14* (2013.01); *F01N 1/24* (2013.01); *F01N 13/00* (2013.01); *F01N 13/005* (2013.01); *F01N 13/16* (2013.01)

(58) Field of Classification Search
CPC ........... F01N 13/16; F01N 1/24; F01N 13/00; F01N 13/005; F16L 9/14
USPC ........... 138/149, 143, 110, 170, 169; 181/246
See application file for complete search history.

(56) References Cited

U.S. PATENT DOCUMENTS 5,052,513 A * 10/1991 Yoshikawa et al. ........... 181/246
5,321,214 A *  6/1994 Uegane et al. ................ 181/211
5,468,923 A * 11/1995 Kleyn ............................ 181/282
6,543,577 B1 *  4/2003 Ferreira et al. ................ 181/282
8,505,682 B2 *  8/2013 Jones et al. .................... 181/246
2004/0231913 A1 * 11/2004 McCombs et al. ............ 181/258
2007/0074930 A1 *  4/2007 Tomerlin et al. .............. 181/252
2009/0078499 A1 *  3/2009 Sikes et al. .................... 181/256

FOREIGN PATENT DOCUMENTS

EP      0360044 A1    3/1990
EP      1992797 A2   11/2008
WO   2007120680 A1  10/2007
WO   2008086513 A1   7/2008

OTHER PUBLICATIONS

International Search Report, mailed Dec. 20, 2010, in related PCT Patent Application No. PCT/CA2010/00403.
Written Opinion, mailed Dec. 20, 2010, in related PCT Patent Application No. PCT/CA2010/00403.
International Preliminary Report on Patentability, mailed Jul. 10, 2012, in related PCT Patent Application No. PCT/CA2010/00403.
European Patent Office, Office Communication, dated Jun. 2, 2015, in European Patent Application No. 10848144.1.

* cited by examiner

*Primary Examiner* — Patrick M Buechner
*Assistant Examiner* — Jeremy W Carroll (57) ABSTRACT

A vehicle exhaust system includes a subsystem having an exterior pipe formed of a polymer. A rigid liner extends along the length of the exterior pipe and defines a passageway. A fiber insulating layer is formed between the rigid liner and the exterior pipe. The liner is formed to define at least one groove circumscribing the periphery of the passageway. The groove defines a region of increased volume of the exhaust passage along the length. The liner is further formed to define at least one void extending between the wall of the liner and the insulating layer, around the periphery of the passageway. A plurality of apertures in the liner, allow sound waves to pass from the passageway into the fiber insulating layer, and into the void.

25 Claims, 13 Drawing Sheets

EXHAUST SUBSYSTEM WITH POLYMER HOUSING

RELATED APPLICATIONS

This application is a national filing of International Application No. PCT/CA2010/000403, filed on Mar. 23, 2010, entitled "EXHAUST SUBSYTEM WITH POLYMER HOUSING", having as inventors Baijit Sierra, and owned by instant assignee.

FIELD OF THE INVENTION

The present invention relates generally to exhaust assemblies and methods, and more particularly to exhaust subsystems formed, at least in part, of polymeric materials.

BACKGROUND OF THE INVENTION

Vehicle exhaust assemblies are typically formed of sheet metal or stainless steel to allow the transport of hot exhaust gases from a combustion engine away from the vehicle. Such exhaust assemblies typically include one or more volume mufflers, designed to absorb and dissipate acoustic and thermal energy. Metal is typically primarily used to allow the exhaust system to withstand high temperatures, and transfer heat away in the gases away from the vehicle.

Metal, of course, has its limitations: it is somewhat cumbersome to form; it is heavy; and bulky. Also the shapes that can be formed are somewhat limited. Further, it is prone to corrosion.

More recently, synthetic materials, such as polymers, have been introduced into vehicle exhaust assemblies. The polymer material is less costly, lighter, and less susceptible to corrosion. At the same time, such materials are typically less able to dissipate heat.

Nevertheless exhaust systems that incorporate synthetic materials are in early stages of development. Accordingly, there remains a need for exhaust systems and subsystems that take advantage of synthetic materials.

SUMMARY OF THE INVENTION

In an embodiment, an exhaust subsystem includes an exterior pipe comprising polymer for carrying gases from an engine. A rigid liner within the exterior pipe extends along a length of the exhaust subsystem and defines a passageway having a periphery. A fiber insulating layer is formed between the rigid liner and the exterior pipe. The liner is formed to define at least one groove circumscribing the periphery of the passageway. The groove defines a region of increased cross-sectional area of the passageway along a length of the passageway. The liner is further formed to define at least one void extending between the liner and the insulating layer, around the perimeter of the passageway. The liner comprises a plurality of apertures in communication with the void, allowing sound waves to pass from the passageway into the fiber insulating layer, and into the void.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
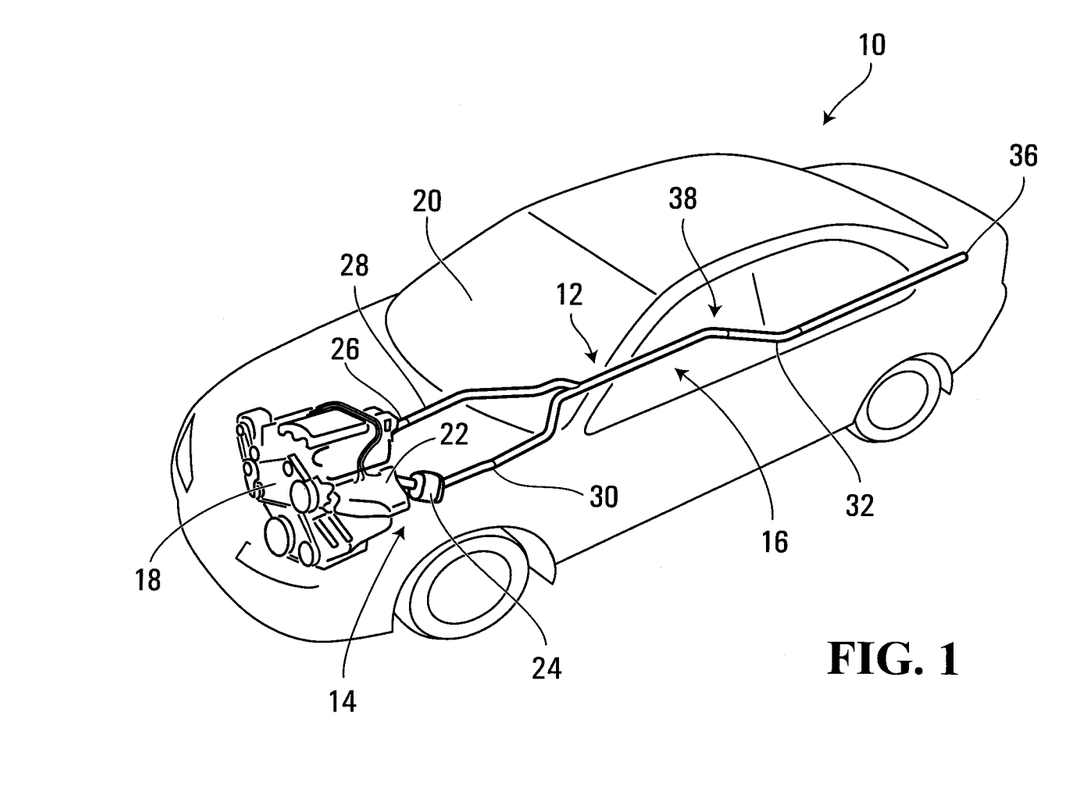
FIG. 1 is a schematic view of a vehicle including an exhaust assembly and exhaust subsystem, exemplary of an embodiment of the present invention.

FIG. 1 illustrates a vehicle 10 which includes an exhaust assembly 12, formed of two separate exhaust subsystems: a forward exhaust subsystem 14 formed predominantly of metal exhaust components, in the form of stainless steel, steel, iron, nickel and the like; and an aft exhaust subsystem 16, having a polymeric exterior housing, exemplary of an embodiment of the present invention.

As illustrated in FIG. 1, vehicle 10 includes an internal combustion engine 18, located forward of a passenger compartment 20. Exhaust assembly 12 interconnects to internal combustion engine 18 and guides exhaust gases from internal combustion engine 18 to the rear of vehicle 10, allowing those gases to exhaust away from vehicle 10. Forward exhaust subsystem 14 is in fluid communication with internal combustion engine 18, and may include one or more exhaust components, such as exhaust manifolds 22, catalytic convertors/particle filters 24, and one or more metal pipes 26 emanating from internal combustion engine 18 and connected in flow series. Forward exhaust subsystem 14 is further in flow communication with aft exhaust subsystem 16. Aft exhaust subsystem 16 is located downstream of forward exhaust subsystem 14, in the direction of exhaust flow.

Exhaust subsystems 14, 16 are physically mounted to the vehicle in a conventional manner, for example, by being suspended from the chassis of vehicle 10.

Forward exhaust subsystem 14 may define one or more flow paths 28 between internal combustion engine 18 and aft exhaust subsystem 16. As illustrated, forward exhaust subsystem 14 may provide a discrete flow path 28 on each side of internal combustion engine 18 to aft exhaust subsystem 16. Multiple flow paths 28 may converge to a single path to feed aft exhaust subsystem 16.

Aft exhaust subsystem 16 includes one or more coupling assembly(ies) 30 which connect forward exhaust subsystem 14 with aft exhaust subsystem 16. Coupling assemblies 30 are typically also formed of metal, and provide an interface between the substantially polymeric components of aft exhaust subsystem 16 and forward exhaust subsystem 14. As illustrated, coupling assembly 30 is located downstream of the catalytic convertor/particle filter 24 of vehicle 10. However, coupling assembly 30 may be located anywhere downstream of exhaust manifold 22 of vehicle 10.

Aft exhaust subsystem 16 is housed in a non-metal exterior pipe 32. As illustrated in FIG. 1, exterior pipe 32 is cylindrical in cross-section, and may be of a constant diameter. However, exterior pipe 32 may be of any arbitrary cross-section. Exterior pipe 32 defines an interior passage 34 for the transport of exhaust gases to outlet 36 of vehicle 10. Aft exhaust subsystem 16 may include one or more sound attenuation regions 38 downstream of coupling assembly 30. Sound attenuation regions 38 may extend from coupling assembly 30 to the exhaust outlet 36, or may extend along the length of exterior pipe 32 at discrete intervals along the length of aft exhaust subsystem 16.

Figure 2:
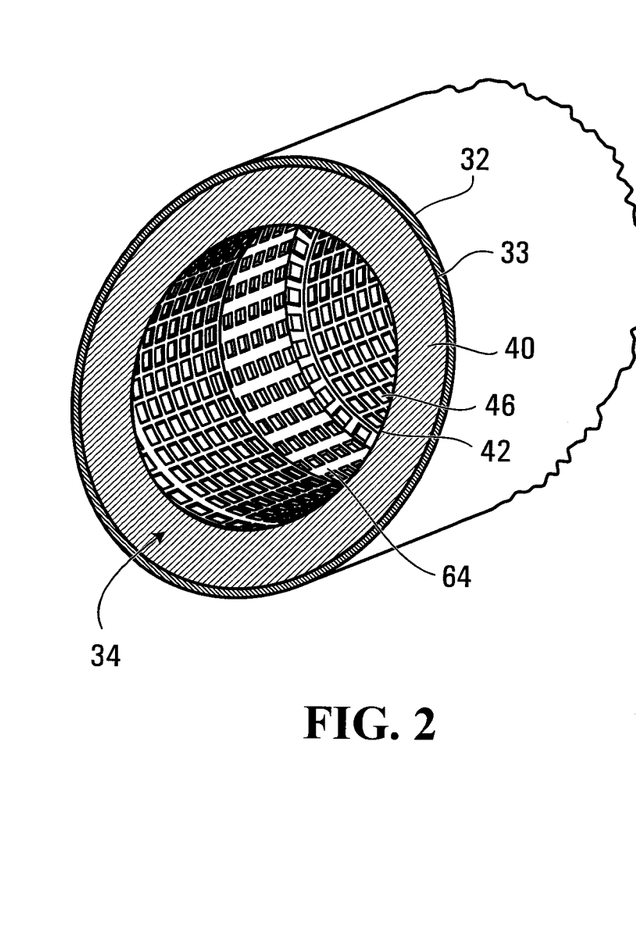
FIG. 2 is an end perspective view of an exhaust subsystem of FIG. 1.
Figure 3:
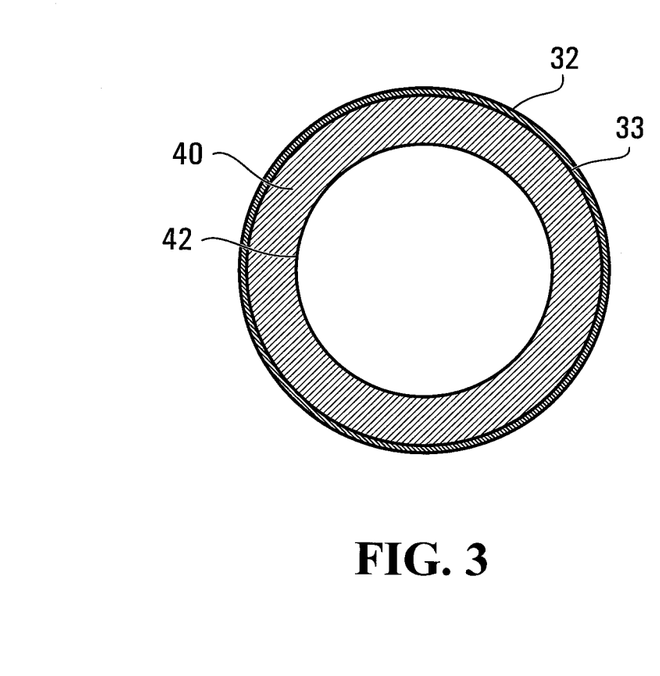
FIG. 3 is a cross-sectional view of the exhaust subsystem of FIG. 1 at III-III.

Throughout at least a portion of the length of exterior pipe 32, aft exhaust subsystem 16 is formed of four or more distinct layers, as best illustrated in FIGS. 2 and 3: an exterior pipe 32; a thermal reflective coating 33 applied to the inner wall of exterior pipe 32, an acoustic insulation layer 40 formed interior to exterior pipe 32; and a liner 42, located between interior passage 34 and liner 42. Acoustic insulation layer 40 and liner 42 extend along the length of interior passage 34, and may extend substantially along the length of aft exhaust subsystem 16.

Exterior pipe 32 may be formed in whole or in part of a polymer material, such as a polyester, ethylene terepthelate, or the like, or composites thereof.

Thermal reflective coating 33 may be a thin double-layer foil of melamine and heat-reflective paint, and may be applied to exterior pipe 32 during the plastic forming process. However, thermal reflective coating 33 may be any thin coating with suitable thermal properties, known to those of ordinary skill, and may be applied to the interior of exterior pipe 32, after formation of exterior pipe 32.

In the depicted embodiment, representative of a passenger vehicle having a small-displacement engine, the diameter of exterior pipe 32 is between approximately 70 mm and 100 mm; the thickness of thermal reflective coating 33 is between approximately 0.2 mm and 0.5 mm; the diameter of liner 42 is between approximately 40 mm and 60 mm; the thickness of liner 42 is between approximately 0.5 mm and 2.5 mm and the thickness of acoustic insulation layer 40 is between about 10 mm and 30 mm. These dimensions may be chosen based on the size and type of internal combustion engine 18, the flow rate and temperature of gas to be exhausted, and the frequencies of sound that are being attenuated. The arrangement of insulation layer 40; and liner 42 allow the formation of sound attenuation regions 38, along the length of exterior pipe 32.

As illustrated, liner 42 is located radially outward of interior passage 34, and retains or supports acoustic insulation layer 40 against the inner wall of exterior pipe 32. Liner 42 further provides fluid communication between interior passage 34 and acoustic insulation layer 40, allowing sound waves to pass into acoustic insulation layer 40.

Acoustic insulation layer 40 is preferably formed of mineral fiber insulation to provide for acoustic and thermal insulation, but may be any type of insulation material or combination of materials with sufficient thermal and acoustic insulation properties, such as glass fiber.

The depicted liner 42 has the same cross-sectional shape as exterior pipe 32. However, liner 42 and exterior pipe 32 may have different cross-sectional shapes, provided liner 42 fits inside exterior pipe 32, around interior passage 34. Moreover, as will become apparent, liner 42 may have differing cross-sectional sizes, at various axial positions along passage 34. In the depicted embodiment, liner 42 is made from stainless steel so that its shape is self-supporting. However, other suitable materials—including plastics, composites or the like, will be appreciated by those of ordinary skill. Likewise, it may be made from other metal materials, provided they are of sufficient strength for the shape to be self-supporting. To allow fluid communication between interior passage 34 and acoustic insulation layer 40, liner 42 includes a plurality of perforations 46. Liner 42 may be formed from a generally flat sheet as depicted in FIG. 6, and rolled into a lengthwise extending cylindrical tube, as further described.

Figure 6:
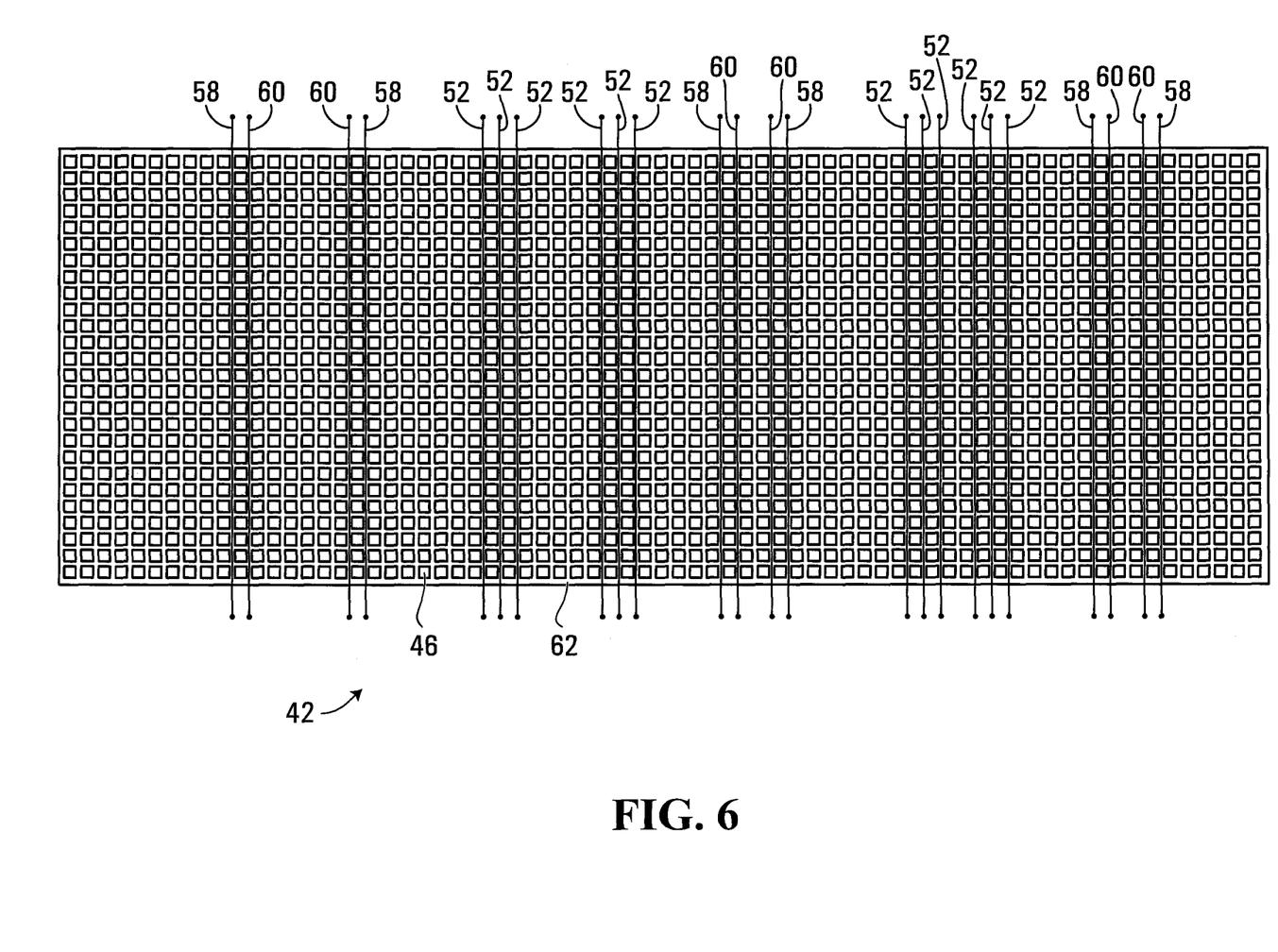
FIG. 6 is a plan of a liner forming part of the exhaust subsystem of FIG. 2.

As best shown in FIG. 6, perforations 46 are formed throughout the surface 62 of liner 42. Perforations 46 may be of a consistent size and shape, or may be of a number of different sizes and shapes. Perforations 46 may be evenly spaced, or the spacing may be varied. In particular, as will be discussed below, the relationship between the size and spacing of perforations 46 and the dimensions of grooves 48 or voids 50 may affect the acoustic performance of exhaust subsystem. Thus, the size and spacing of perforations 46 may be selected to maximize attenuation of sounds in certain frequency ranges.

Perforations 46 in liner 42 create absorption regions along the length of interior passage 34. More specifically, energy in the form of acoustic and thermal energy within the exhaust gases passes through perforations 46 into acoustic/thermal insulation layer 40, where it may be substantially absorbed by the material forming acoustic/thermal insulation layer 40. Conveniently, such absorption regions may be located at curves in the exhaust for improved acoustic performance; however absorption regions may be located anywhere along the length of interior passage 34.

Liner 42 may further define a series of grooves 48 and voids 50 extending around periphery of interior passage 34 in each sound attenuation region 38, to further assist in attenuating engine and exhaust noise.

Figure 4:
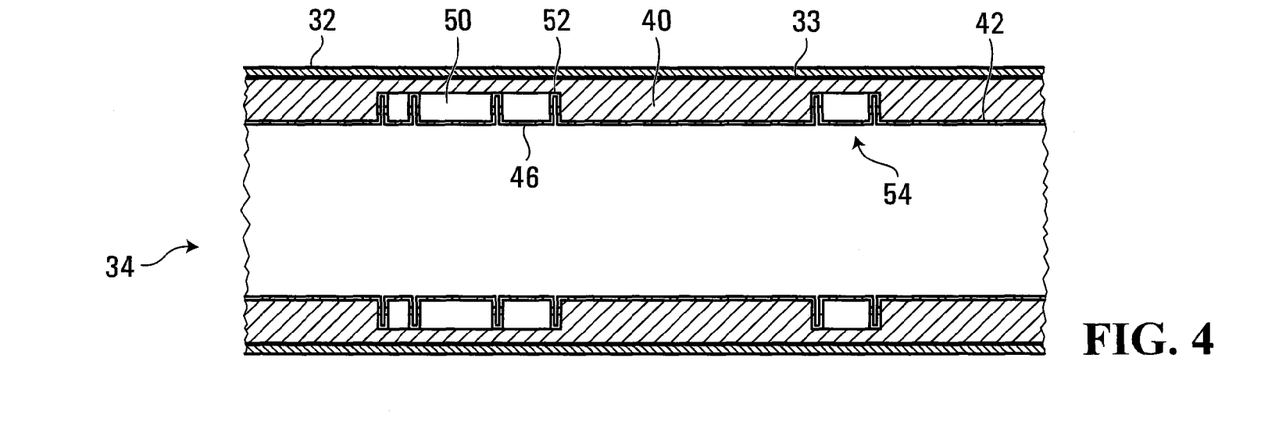
FIGS. 4 and 5 are axial cross-sectional views of a portion of the exhaust subsystem of FIG. 2.

As illustrated in FIG. 4, each of voids 50 take the form of an annular cavity between liner 42 and insulation layer 40. Each of voids 50 is formed by two opposing annular ribs 52 which extend radially outward from passageway 34 and hold insulation 40 away from liner 42. As illustrated, ribs 52 are formed from liner 42. Ribs 52 may, for example be formed by folding or pinching liner twice into overlapping relationship (example fold lines are shown in FIG. 6). However, ribs 52 could be formed in other ways.

Insulation layer 40 is pre-formed into the required shape and wrapped around liner 42. The pre-forming, along with ribs 52, ensures that the material of insulation layer 40 is held taut between ribs 52.

The resulting voids 50 define resonance chambers 54 bounded on the radially inward surface by liner 42, on the radially outward surface by acoustic insulation layer 40, and at the ends by ribs 52. Each resonance chamber 54 has a width, measured along the length of passageway 34 and a depth, measured in the radial direction of aft exhaust subsystem 16.

Resonance chambers 54 may be annular in shape, or may be formed in alternative shapes and orientations. Resonance chambers 54 may be of a consistent length, depth and shape, or there may be resonance chambers 54 of multiple shapes and dimensions.

Resonance chambers 54 are in fluid communication with interior passage 34 through one or more perforations 46. Sound waves in interior passage 34 excite the air in perforations 46. This causes the air inside each resonance chamber 54 to resonate at a particular frequency, determined, in the simple case, by the following relationship:

$$V = \frac{s^2 A_t}{f^2(t_o + 1.6r)}$$

Where f is the frequency, $A_t$ is the total surface area of all perforations 46 through which resonance chamber 54 is in communication with interior passage 34, r is the radius of one perforation 46, s is the speed of sound at operating temperature, $t_o$ is the thickness of liner 42, and V is the volume of resonance chamber 54.

For a perforation 46 which is non-circular, the effective radius r may be used. For example, the effective radius r may be approximated as one-half of the hydraulic diameter of the perforation 46, where hydraulic diameter is determined by the following equation, in which $A_p$ and P are the area and perimeter of the perforation, respectively:

$$D_{hydraulic} = \frac{4A_p}{P}$$

Conveniently, aft exhaust subsystem 16 may be designed by selecting parameters A, r and $t_o$ to attenuate specific frequencies, as required or desired as a result of frequencies by engine 18. That is for any particular engine 18, and desired acoustic properties, A, r and $t_o$, may be chosen and one or more resonance chambers 54 may be placed along the passage 34.

A person of skill will readily recognize that the above mathematical relation is intended to be illustrative for a simple case, where the size of perforations 46 and thickness of liner 42 is uniform. Of course, where the thickness and size is not uniform, the resonance frequency will vary. Likewise, if multiple resonance chambers 54 are coupled, by common air volume, for example, their resonance frequency may vary. Such variation may be determined by computer simulation, or trial and error.

Resonance chambers 54 may be located at any point, or at multiple points along the axis of aft exhaust subsystem 16. Preferably, a resonance chamber 54 which is tuned to attenuate sounds at a particular frequency should be located at a distance from the inlet of aft exhaust subsystem 16 equivalent to at least one quarter of the wavelength corresponding to a sound wave at the particular frequency. This placement may ensure that resonance chamber 54 is exposed to the peak pressure created by the sound wave, maximizing the amplitude of the resonant vibration. Resonance chambers placed less than one quarter wavelength away from exhaust manifold 22 will typically not be exposed to such peak pressures, as will be appreciated, this will result in decreased effectiveness.

Figure 5:
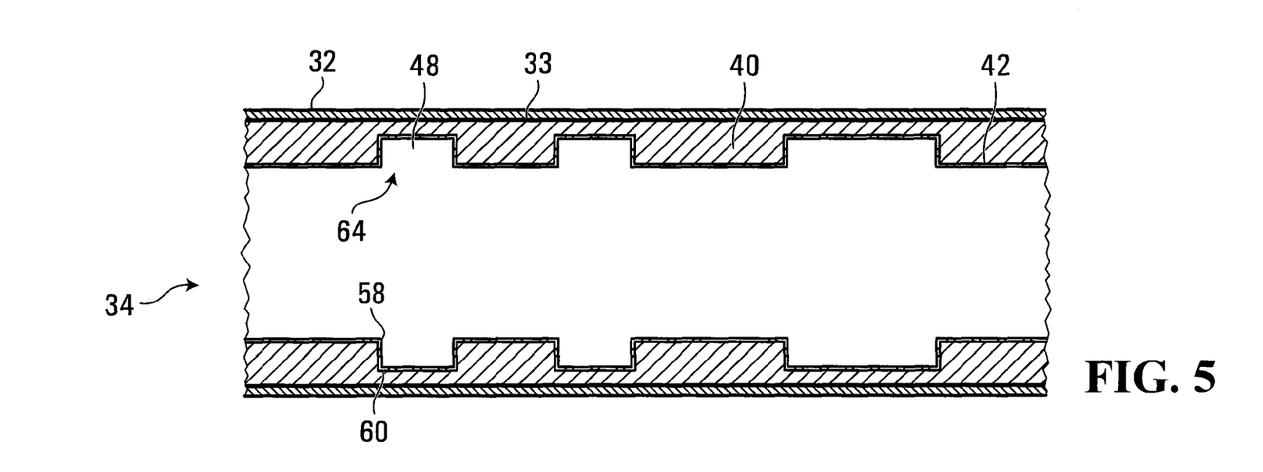

Sound attenuation region 38 also includes one or more grooves 48 on the radially inward side of liner 42, around the periphery of passage 34 defining expansion regions 64. As illustrated in FIG. 5, grooves 48 may be formed as generally annular deformations in liner 42. As a consequence, the cross sectional area of interior passage 34 increases beyond the cross sectional area in the absence of such grooves. Each groove 48 may be defined by two opposing annular walls 56, each defined by two sharp bends 58 and 60 in liner 42. The resulting expansion regions 64 have a width, measured along the length of interior passage 34 of aft exhaust subsystem 16 and a depth, measured in the radial direction of aft exhaust subsystem 16.

Again, grooves 48 may be annular in shape, or may be formed in alternative shapes. Similarly, grooves 48 may be of a consistent length, depth and shape, or there may be grooves 48 of multiple shapes and dimensions.

Expansion regions 64 are effective at attenuating lower frequency sounds than those attenuated in resonance chambers 54. Further, expansion regions 64 of large volume attenuate lower frequencies than expansion regions 64 which are smaller in volume. The optimal dimensions of an expansion region 64 can again be determined heuristically or by computer simulation, given a particular frequency of interest and a particular diameter of passage 34.

Expansion regions 64 may be located at any point along passage 34 of aft exhaust subsystem 16. Preferably, expansion regions 64 are located anywhere in aft exhaust subsystem 16 where there are no resonance chambers 54. Expansion regions 64 which are intended to attenuate sounds at a particular frequency are preferably located at a distance from the inlet of aft exhaust subsystem 16 of at least one-quarter of the wavelength corresponding to that frequency.

Figure 7:
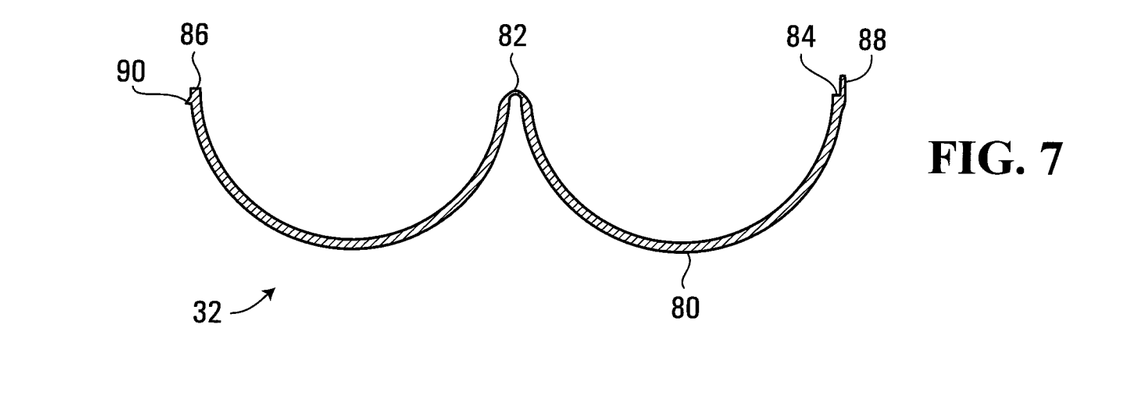
FIGS. 7 to 9 are cross-sectional views of the exterior shell of the exhaust subsystem of FIG. 2.
Figure 8:
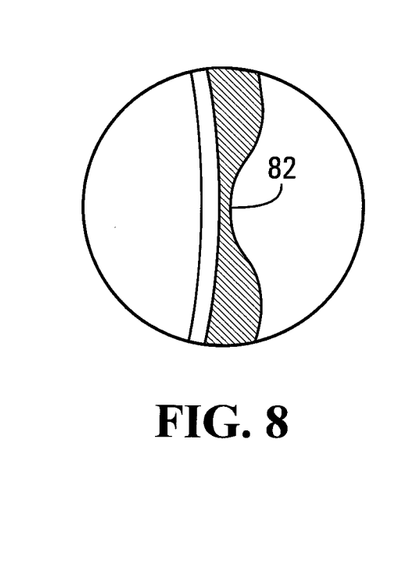

Conveniently exterior pipe 32 may be injection or extrusion molded. As illustrated in FIG. 7, exterior pipe 32 may be fabricated by forming a clam shell 80. Shell 80 may be formed by injection-molding, extrusion, blow molding, or any other polymer manufacturing process. Clam shell 80 includes two half-shells that may that may be joined together. In the depicted embodiment, the half-shells may be injection-molded as a single shell 80, joined at their inner edge by hinge 82. Hinge 82 may be formed by molding the connection between the two halves of clam shell 80 as a thin wall portion, as more particularly illustrated in FIG. 8.

Figure 9:
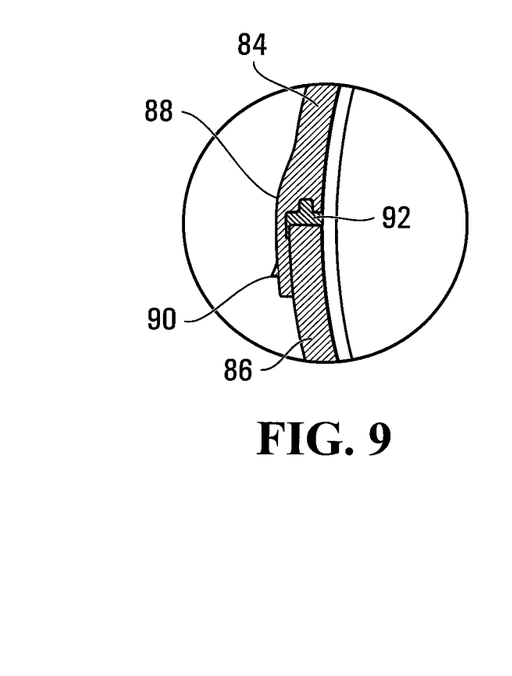

Outer edges 84 and 86 of shell 80 may include elements that engage to lock shell 80 into a cylinder to form exterior pipe 32. As illustrated more particularly in FIG. 9, each end of shell 80 includes a complementary lock portion. In particular, one end may be formed to include a lock socket 88 that may receive a complementary lock edge 86 having a retaining nib 90. Nib 90 may be received in a groove of lock socket 88, to retain lock edge 86 in lock socket 88. Optionally, the lock may be glued or welded shut.

Conveniently, exhaust subsystem 16 may be formed by injection molding exterior pipe 32, as clamshell 80; filling clamshell 80 with a layer of fibrous insulation to form insulation layer 40; and inserting liner 42 and optionally pipe 44. Once the insulation, liner 42 and pipe 44 are contained within clamshell 80, it may be closed and locked.

Figure 10:
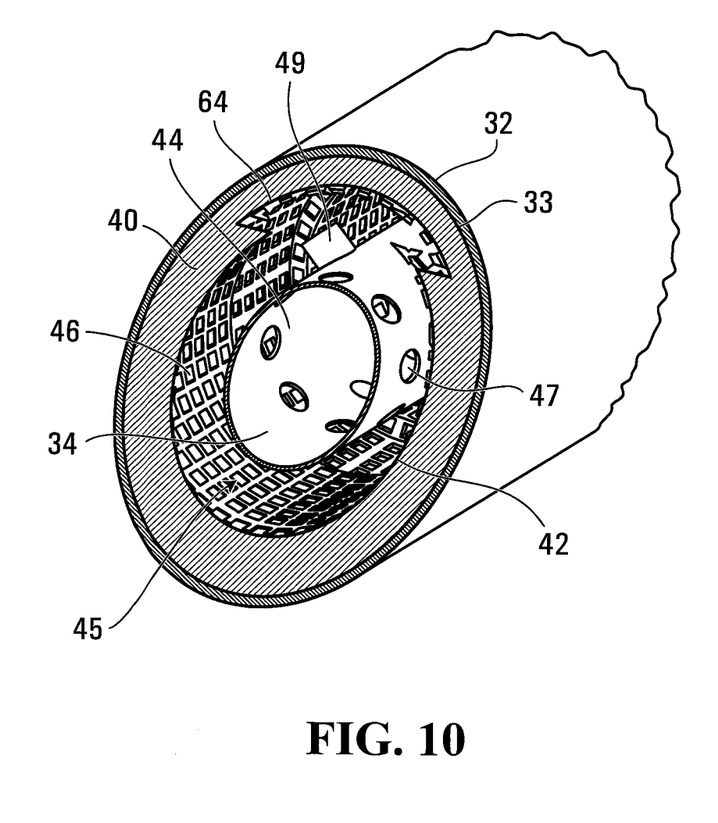
FIG. 10 an end view of an alternative exhaust subsystem, exemplary of an embodiment of the present invention.
Figure 11:
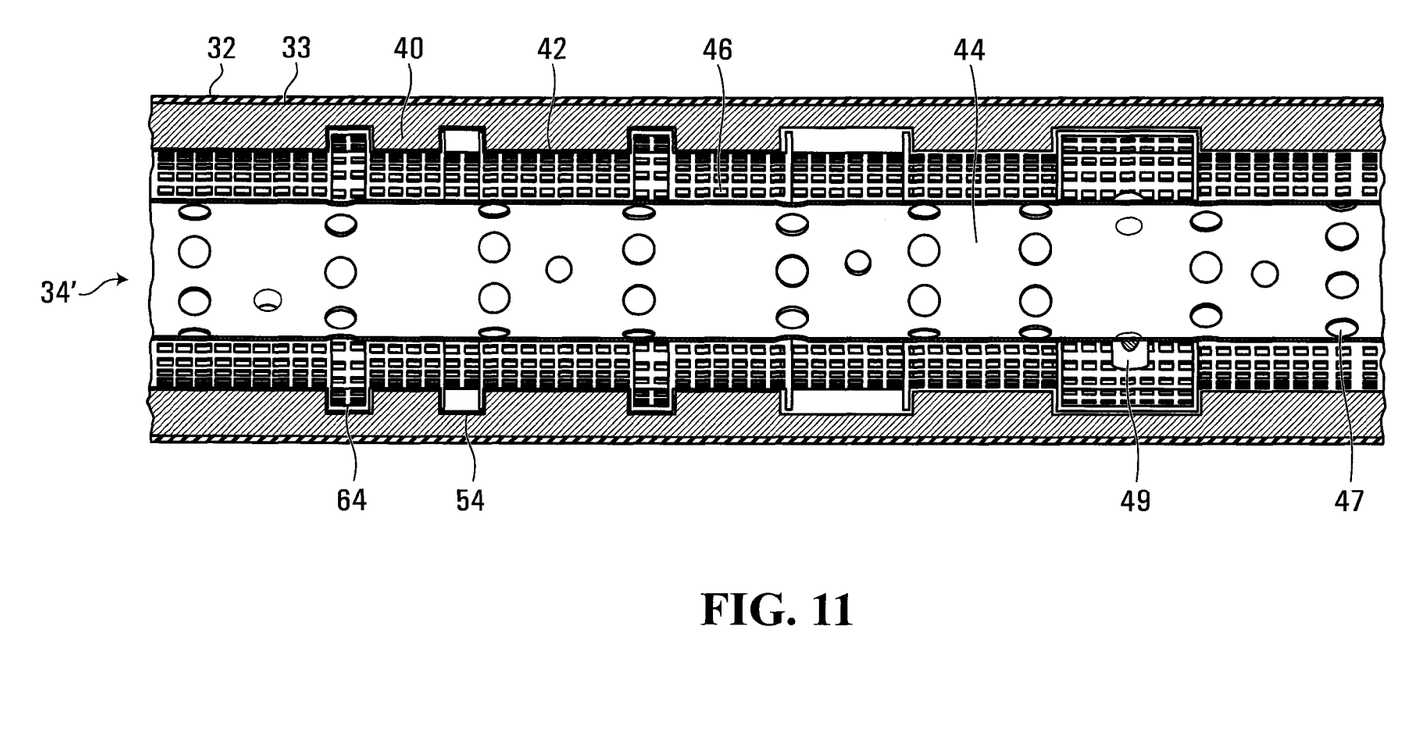
FIG. 11 is an axial cross-sectional views of a portion of the exhaust subsystem of FIG. 10.

In an alternative embodiment, illustrated in FIGS. 10 and 11, exhaust subsystem 16 may further include an interior pipe 44. Interior pipe 44 may be a conventional metal pipe, defining passage 34' parallel to exterior pipe 32. Pipe 44 may be spaced from liner 42 by radially-extending discs (not shown) which support pipe 44 on liner 42 and which are attached to liner 42 by conventional means, for example, welding or crimping. The spacing of pipe 44 from liner 42 defines a void 45 between liner 42 and pipe 44. Pipe 44 may include multiple apertures 47 through which void 45 is in fluid communication with passage 34'. Apertures 47 may optionally be provided with extensions 49, having a height in the radial direction. Void 45 forms a resonance chamber analogous to resonance chambers 54. Sound waves travelling in pipe 44 cause excitation of the air in apertures 47, which cause the air in void 45 to resonate. Similar to resonance chambers 54, this resonance frequency is dependent on the volume of void 45 and the number and size of apertures 47, as well as the wall thickness of pipe 44. Thus, likewise to resonance chambers 54, the sound attenuation performance of resonance chambers 54 can be tuned for a particular frequency. Again the resonance frequency achieved by apertures 47 may be calculated as $$V = \frac{s^2 A}{f^2(t_o + 1.6r)}$$

where V is the volume of void 45, s is the speed of sound at operating temperature, $t_o$ is thickness of pipe 44, A is the surface area of apertures 47, and r is the radius of one aperture 47.

Optionally, some or all of apertures 47 may be surrounded by cylindrical extensions 49. Extensions 49 increase the effective volume of air which interacts with the air in void 45, causing it to resonate. For a fixed number of apertures 47 having a fixed size and interacting with a void 45 of fixed volume, the frequency at which the system resonates will be reduced as a result the addition of extensions 49. If all apertures 47 are surrounded by extensions 49 of a particular height measured in the radial direction, that height will replace the term $t_o$ in the above relationship. If only some of apertures 47 are surrounded by extensions 49, the frequency at which the air in void 45 resonates may be determined heuristically.

Figure 12:
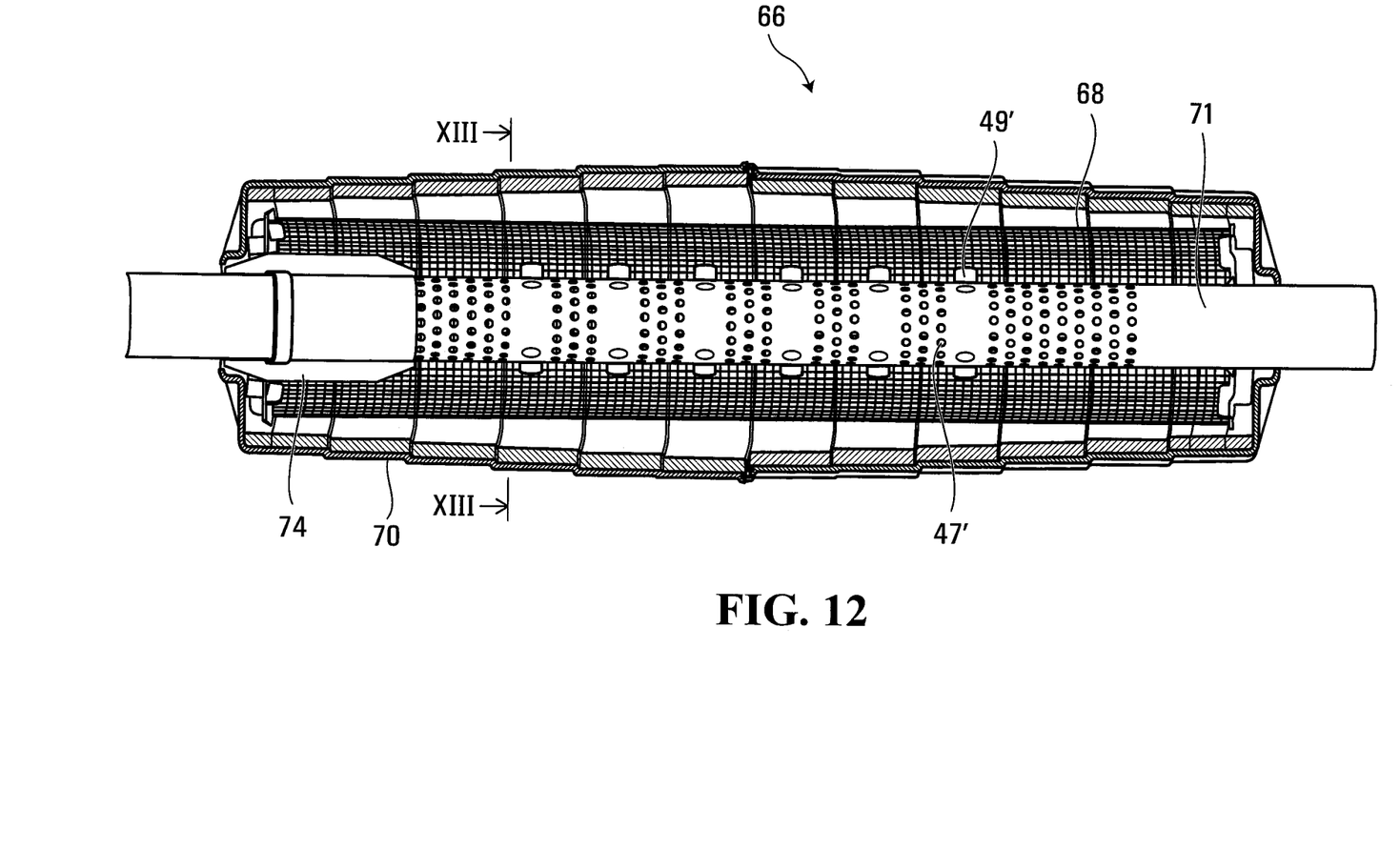
FIG. 12 is an axial cross-section of a volume muffler that may form part of the exhaust subsystem of FIG. 2.
Figure 13:
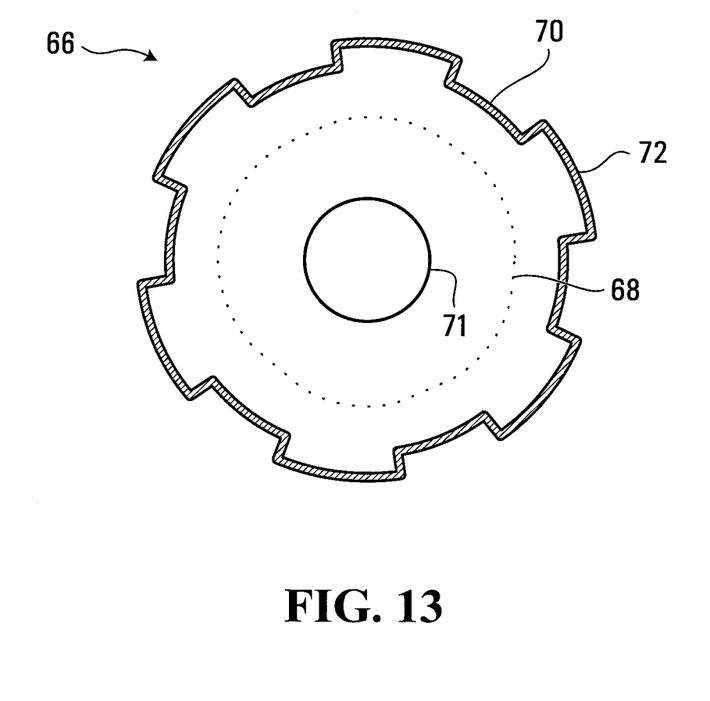
FIG. 13 is a radial cross-section of the volume muffler of FIG. 12.

In an alternate embodiment, aft exhaust subsystem 16 may further include a volume muffler 66, depicted in FIGS. 12 and 13. Volume muffler 66 additionally includes a non-metal (e.g. polymeric) muffler housing 70. Muffler housing 70 may retain an interior metal pipe 71 (best viewed in FIG. 12). The pipe may be an extension of pipe 44 (FIG. 10) having apertures 47' and/or extensions 49' along its length, or may be another pipe segment that may be interconnected with/in flow communication with pipe 44 or passage 34. A catalytic convertor or particulate filter 74 may be contained in housing 70 proximate the inlet to volume muffler 66. Pipe 71 in muffler housing 70 may be surrounded by a mesh 68, spaced radially outward from pipe 71. The gap between pipe 71 and mesh 68, and the apertures in pipe 71 interact to form a resonance chamber akin to that of the embodiment depicted in FIG. 10. Fibrous insulation may fill the region between mesh 68 and housing 70. Conveniently, housing 70 may include lengthwise extending ribs 72, providing structural rigidity to muffler housing 70. Each rib 72 may be generally rectangular, defined by an arced wall portion and opposing, radially extending walls. Housing 70 may be extrusion or injection molded. As illustrated, volume muffler 66 has a generally circular cross-section with protruding ribs. However, volume muffler 66 may be formed in any arbitrary shape.

Figure 14:
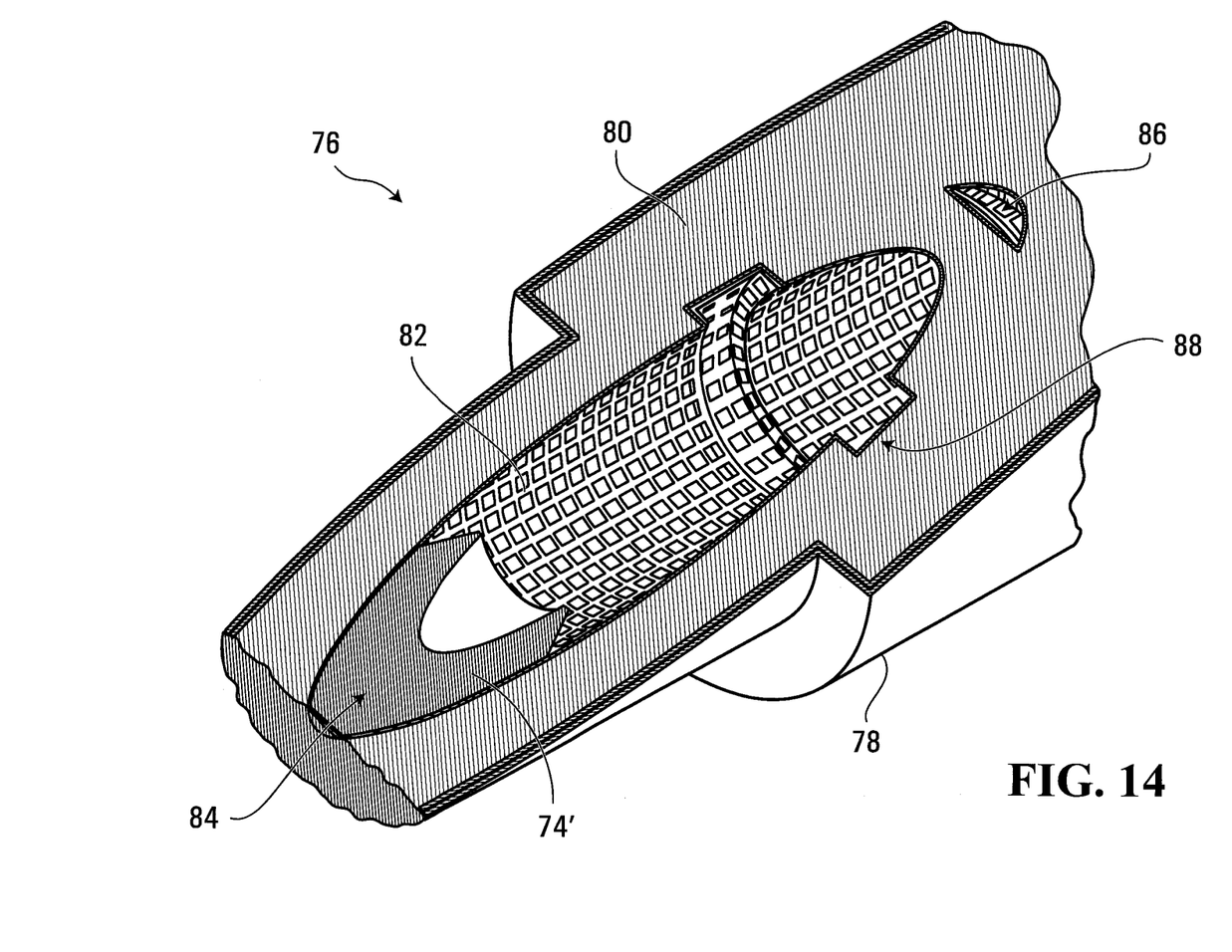
FIG. 14 is a partial cut-away perspective view of a further volume muffler that may form part of the exhaust subsystem of FIG. 2.
Figure 15:
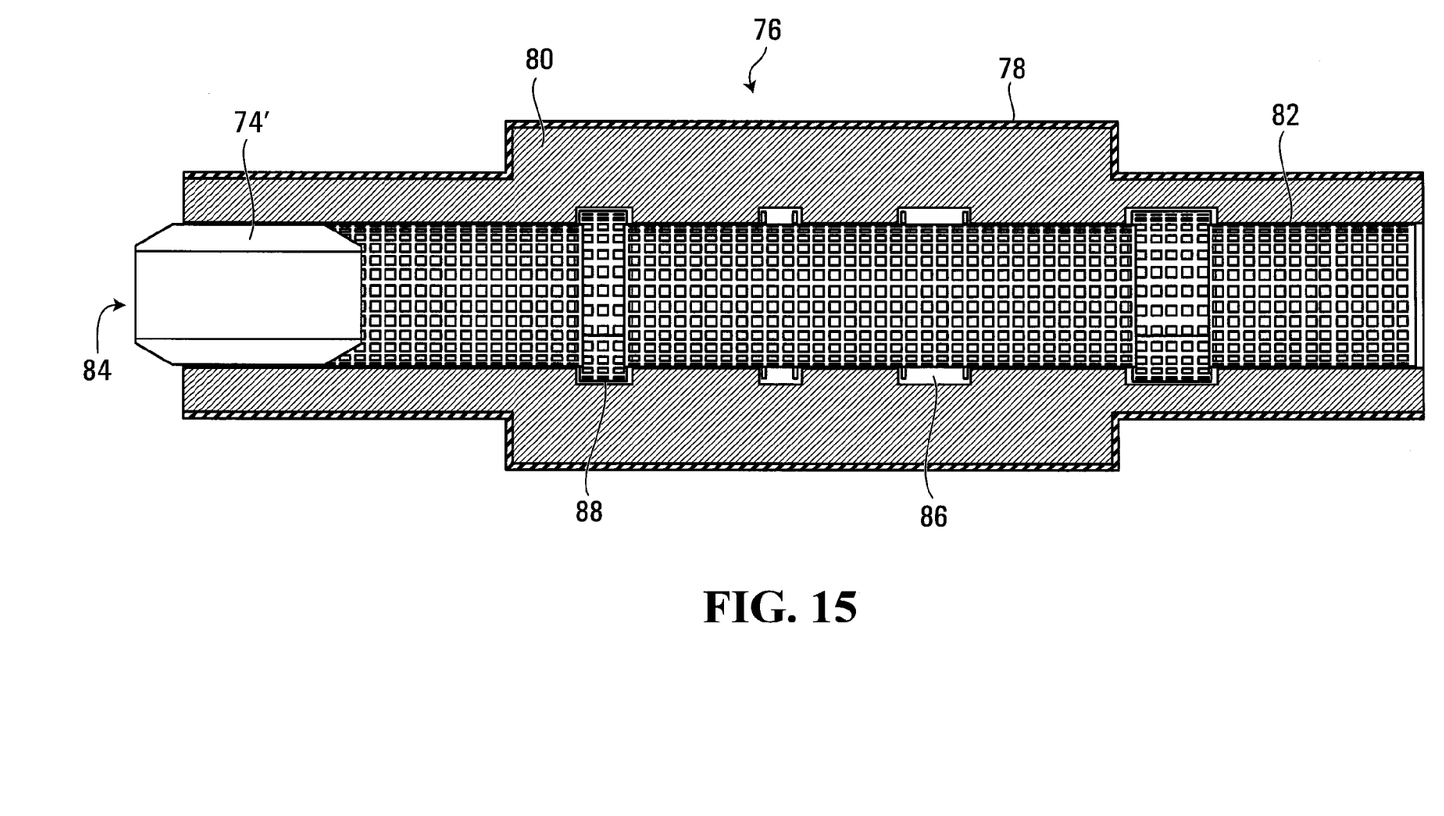
FIG. 15 is an axial cross-sectional view of the volume muffler of FIG. 14.

In a further alternate embodiment, depicted in FIGS. 14 and 15, aft exhaust subsystem 16 may include a volume muffler 76 which includes a housing 78, insulation 80 (like insulation layer 40), and a liner 82 (like liner 42). Liner 82 may define a passage 84 through the lengthwise extent of volume muffler 76. Resonance chambers 86 (like resonance chambers 54) and expansion regions 88 (like expansion regions 64) may be formed in liner 82. Insulation 80 (like insulation layer 40) may fill the region between housing 78 and liner 82.

Figure 16:
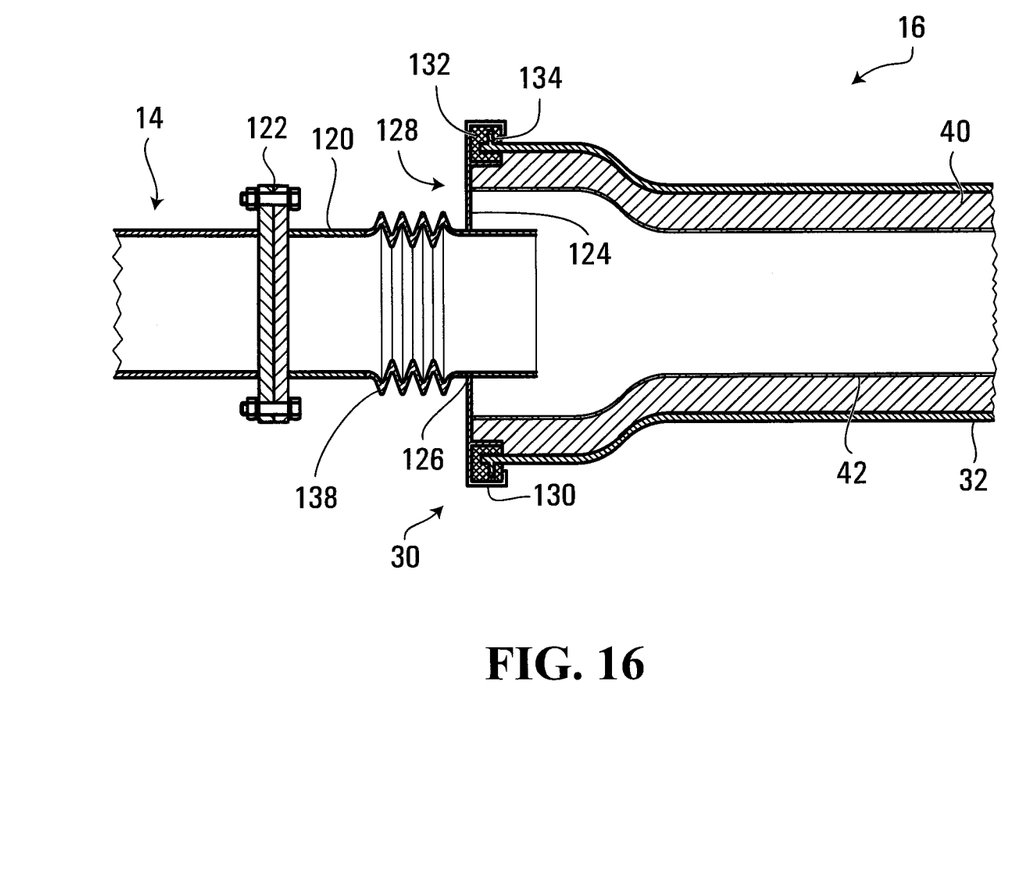
FIG. 16 is a cross-sectional view of a portion of the exhaust subsystem of FIG. 2, illustrating a coupling assembly.

Coupling assembly 30 used to connect aft subsystem 16 to forward subsystem 14 is more particularly illustrated in FIG. 16. Coupling assembly 30 may attach to forward subsystem 14 at any suitable location downstream of exhaust manifold 22 of vehicle 10. As illustrated, coupling assembly 30 includes a metal pipe stub 120 that is attached, for example, by welding, at its upstream end to a metallic upstream flange 122. Upstream flange 122 allows for metal-to-metal flange connection by abutting a complementary flange on forward subsystem 14 thereby sealingly attaching aft exhaust subsystem 16 in fluid communication to forward subsystem 14. Upstream flange 122 is mechanically affixed using a conventional fastener, locking the position of coupling assembly 30, and thus aft exhaust subsystem 16, to upstream forward exhaust subsystem 14.

Metal pipe stub 120 is attached at its other end, for example, by welding, to a thin metal flange 124, proximate the downstream end of metal pipe stub 126. Thin metal flange 124 should be thin—possibly as thin as possible, while remaining rigid. Typically, thin metal flange 124 is approximately 1.5 mm thick. Metal flange 124 connects coupling assembly 30 in fluid communication with exterior pipe 32. Thin metal flange 124 has a small flange-pipe surface area 126 in direct contact with metal pipe 120 and a large convective surface area 128 in contact with ambient air. The large size of convective surface area 128 relative flange-pipe surface area 126, promotes heat dissipation to ambient air. Thin metal flange 124 further includes an annular collar 130 extending axially in the downstream direction, which engages a retaining ring 132. Retaining ring 132 engages a set of tabs 134 on the outer surface of exterior pipe 32. Tabs 134 lock the axial and rotational position of exterior pipe 32 relative to coupling assembly 30. Alternatively, two separate sets of tabs may be used, with one set to lock the axial position of exterior pipe 32, and one set to lock the rotational position of exterior pipe 32.

Metal pipe stub 120 may extend downstream of thin metal flange 124 in the axial direction. The downstream end of metal pipe stub 120 may be shaped to enhance the fluid mechanic properties of exhaust gases entering exhaust subsystem. For example, metal pipe stub 120 may terminate in a converging or diverging nozzle.

As will be appreciated, gases in metal pipe stub 120 may be extremely hot. In certain operating conditions, metal pipe stub 120 may reach temperatures in excess of 600° C. Exposure to such high temperatures could damage exterior pipe 32. For example, if placed in direct thermal contact with metal pipe stub 120, exterior pipe 32 could melt.

As such, metal flange 120 provides thermal protection of exterior housing pipe 32. The quantity of conduction from metal pipe stub 120 to thin metal flange 120 is limited by small size of flange-pipe surface area 126. Moreover, the area of convective surface 128 is large relative to flange-pipe surface area 126. As a result, a significant quantity of the heat transferred into thin metal flange 124 by conduction from metal pipe 120 is transferred to ambient air, rather than being conducted to exterior pipe 32.

Metal pipe stub 120 may further include an accordion-like bellows section 138 located upstream of thin metal flange 124. Bellows section 138 may be capable of deforming in an axial direction, to absorb mechanical and thermal stresses. Conveniently, bellows section 138 prevents axial vibrations from being transmitted to exhaust subsystem 16 from engine 18 and forward exhaust subsystem 14.

Figure 17:
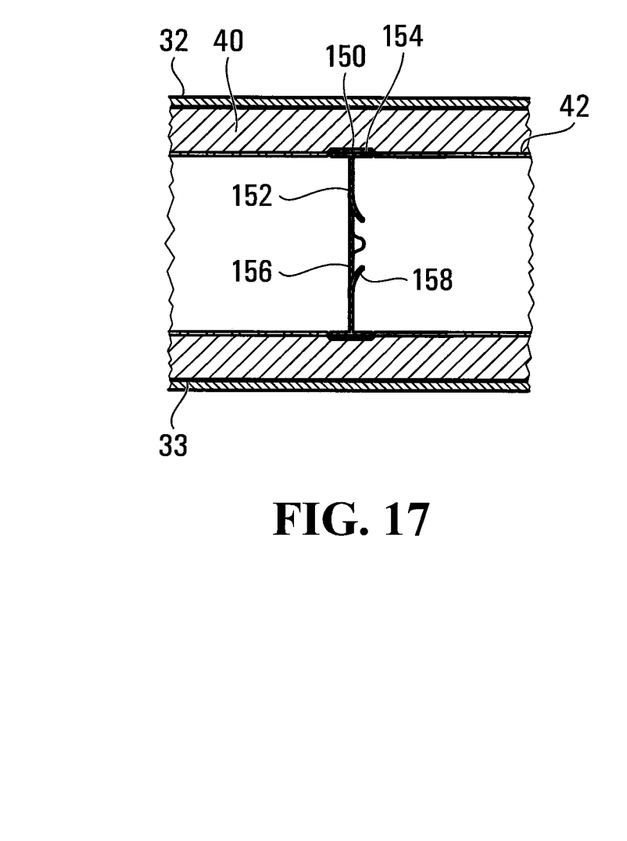
FIG. 17 is a cross-sectional view of a portion of the exhaust subsystem of FIG. 2, illustrating a baffle.
Figure 18:
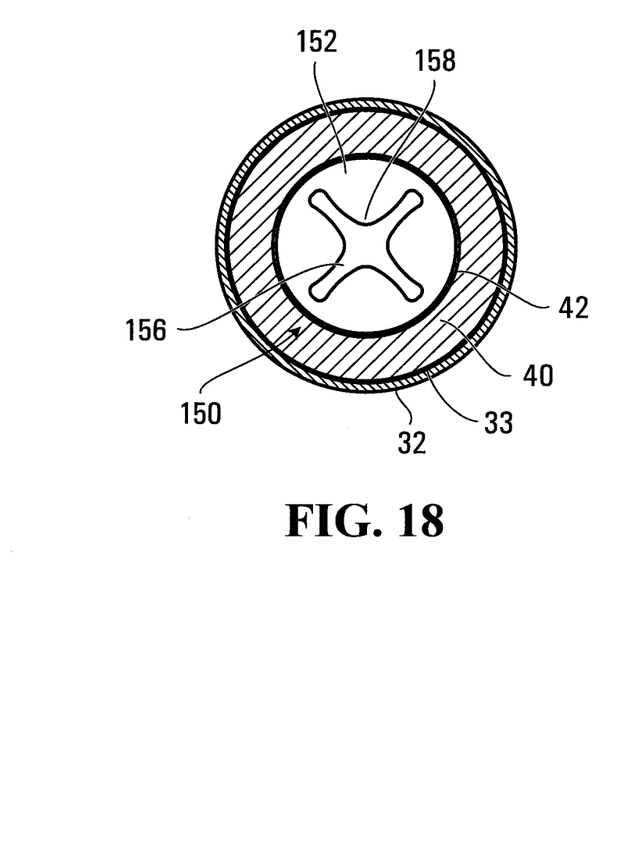
FIG. 18 is a radial cross-sectional view of a portion of the exhaust subsystem of FIG. 2, illustrating a baffle.

Additionally and optionally, exhaust subsystem 16 may also include one or more baffles 150 within passage 34 along its length, depicted in FIGS. 17 and 18. Baffles 150 may be located proximate the upstream end of exhaust subsystem 16, or may be located at any point. Baffles 150 include a face 152 positioned generally normal to the flow of gases through passage 34 and a baffle flange 154 attached to liner 42 by conventional means, for example, by spot welding. Face 152 has an aperture 156 which allows exhaust gases to pass through baffle 150 and which defines one or more lobes 158 in face 152. Baffles 150 may be constructed of a metal material, for example, stainless steel or spring steel. The material, thickness and shape of lobes 158 is chosen so that lobes 158 resonate at a particular frequency. Sound waves of this frequency in passage 34 cause the lobes to vibrate. This resonant vibration causes an out of phase pressure wave to propagate in the upstream direction of the pipe, destructively interfering with waves of the particular frequency. The material, thickness and shape of the lobes is also chosen so that pressure from exhaust gases can cause lobes 158 to deflect in the downstream direction as illustrated in FIG. 14. When lobes 158 deflect, the size of aperture 156 increases, allowing exhaust gases to pass through baffle 150 more easily.

As will be appreciated, engine 18 produces high-temperature and pressure and expels exhaust gases. Exhaust gases travel through sealed exhaust subsystem 14. Partially cooled exhaust gases exit from subsystem 14 into aft exhaust subsystem 16 by way of coupling assembly 30.

As exhaust gases propagate along passage 34, exhaust gases gradually cool by transferring heat to exhaust subsystem 16, and more particularly to insulation layer 40, which resists heat transfer toward exterior pipe 32.

Although insulation layer 40 may provide sufficient thermal protection, to ensure that heat absorbed from the exhaust gases does not cause exterior pipe 32 to melt or materially deform, insulation 40 limits the amount of heat that may be transferred from the exhaust gases to exhaust subsystem 16. As a consequence, exhaust gases exiting exhaust subsystem 16 exit at higher temperatures than they would in the absence of insulation layer 40. With modern combustion engines, this remains acceptable as such engines produce lower temperature exhaust gases.

In any event, engine 18, in operation, also causes sound waves to propagate down exhaust passage 34. The sounds created by engine 18 may be particularly loud within a certain characteristic frequency range, which is determined by factors including the operating speed (revolutions per minute), number of cylinders and configuration of cylinders of engine 18. Sound waves are created by pulses of high pressure emitted from engine 18, which pass through upstream subsystem 14 to and through exhaust subsystem 16.

As the sound waves travel along passage 34, they may be attenuated in several ways. Specifically, the sound waves may be attenuated by absorption regions along passage 34; resonance chambers 54; expansion regions 64; or by baffles 150.

In the absorption regions, sound waves propagating along passage 34 may pass through perforations 46 in liner 42 and into insulation layer 40. Sound waves entering insulation layer 40 in this manner are absorbed and the energy associated with such waves is dissipated by insulation layer 40. The performance of absorption regions is dependent on their location in exhaust subsystem 16. Absorption regions located in curved sections of exhaust subsystem 16 may be more effective at attenuating sound as sound waves in such curved sections may travel directly into insulation layer 40. Conversely, where passage 34 is aligned with the average direction of propagation of sound waves, waves can enter insulation layer 40 in a direction normal to the direction of the wave's propagation.

In expansion regions 64, the cross-sectional area of interior passage 34 is increased, slowing down the flow of exhaust gases. This improves the effectiveness of sound attenuation insulation layer 40 adjacent to expansion regions 64.

Attenuation of sound by absorption in this manner is particularly effective for high-frequency sounds.

As sound waves pass resonance chambers 54, the waves excite the air in perforations 46, which causes the air inside resonance chambers 54 to resonate. More specifically, sound waves induce Helmholtz resonance at a particular frequency in resonance chambers 54. As set out above, the frequency of this resonance is dependent on the volume of resonance chamber 54, the number and area of perforations 46 through which resonance chamber 54 is in fluid communication with interior passage 34, and the thickness of liner 42. Resonance of the air in resonance chambers 54 causes destructive interference with, and thus attenuates sound waves of the same frequency in interior passage 34.

Sound waves in interior passage 34 also cause air in expansion regions 64 to reflect and/or resonate. Reflection/resonance in expansion regions 64 occurs at low frequencies, for example, less than 500 Hz, less than 300 Hz or less than 200 Hz.

Likewise, propagating sound waves may encounter baffles 150. Upon striking baffles 150, sound waves excite lobes 158. As set out above, lobes 158 are designed such that they resonate at a particular frequency. Resonance of lobes 158 causes waves of the same frequency to propagate along the interior passage 34, in the upstream direction. These waves destructively interfere with waves of the same frequency originating from engine 18, and thus, attenuate sound at that frequency.

As noted, each baffle 150 has lobes 158 and at least one aperture 156. Aperture 156 permits exhaust gases to flow through baffle 150. At higher operating speeds of engine 18, the flow rate of exhaust gases increases. At high flow rates, baffle 150 may restrict flow. When this occurs, pressure will increase upstream of baffle 150, causing lobes 158 to deflect in the downstream direction, increasing the size of aperture 168 and reducing the restriction on gas flow. However, the sound attenuation resulting from the resonance of lobes 158 may be reduced when lobes 158 are deflected in this manner. Thus, lobes 158 may be tuned for attenuation of low frequency sounds, which are prevalent at low engine speeds, when the flow rate of exhaust gas is comparatively low. At higher engine speeds, when higher frequency sounds are predominant, increased exhaust gas flow will cause lobes 158 to deflect, reducing the backpressure created by baffles 150. As should now be apparent, the overall acoustic properties of exhaust subsystem 16 can be customized for application to a specific engine 16. Each of the baffles 150, resonance chambers 54 and expansion regions 64 can be specifically tuned as described above to attenuate sounds in a particular range of frequencies.

Conveniently, subsystem 16 may extend all the way to the exhaust system exit, and may obviate the need for a volume muffler. Conveniently, sound attenuation may occur all the way along the length.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. An exhaust subsystem comprising:
   an exterior pipe comprising polymer, for carrying gases from an engine;
   a rigid liner within said exterior pipe, extending along a length of said exhaust subsystem, defining a passageway having a periphery;
   a fiber insulating layer formed between said rigid liner and said exterior pipe;
   wherein said liner is formed to define at least one groove circumscribing the periphery of said passageway, said at least one groove defining a region of increased cross-sectional area of said passageway along a length of said passageway;
   wherein said liner is further formed to define at least one void extending between said liner and said insulating layer, around the periphery of said passageway; and
   wherein said liner comprises a plurality of apertures in communication with said void, allowing sound waves to pass from said passageway into said fiber insulating layer, and into said at least one void extending around the periphery of said passageway.

2. The exhaust subsystem of claim 1, wherein at least some of said at least one groove and said at least one void are sized to attenuate specific frequencies emitted by a specific engine.

3. The exhaust subsystem of claim 2, wherein said at least one void is designed to attenuate a frequency f, and wherein the volume of said at least one void, V, is chosen such that $$V \approx \frac{s^2 A}{f^2(t_o + 1.6r)},$$

where $t_o$ is the thickness of said liner, s is the speed of sound, A is the total area of said apertures in communication with said void, and r is the effective radius of one of said apertures extending into said void.

4. The exhaust subsystem of claim 3, wherein said at least one void is formed at least one quarter wavelength of sound at said frequency f from an inlet of said exhaust subsystem.

5. The exhaust subsystem of claim 2, wherein said at least one groove is formed at least one quarter wavelength of sound at said specific frequency from an inlet of said exhaust subsystem.

6. The exhaust subsystem of claim 1, wherein said exterior pipe has a generally circular cross-section.

7. The exhaust subsystem of claim 1, further comprising a thermal coating located between said fiber insulating layer and said exterior pipe.

8. The exhaust subsystem of claim 1, further comprising an interior pipe formed interior to said exterior pipe in said passageway, said interior pipe comprising a plurality of openings.

9. The exhaust subsystem of claim 8, wherein at least one of said plurality of openings is surrounded by a cylindrical, radially extending collar.

10. The exhaust subsystem of claim 1, further comprising a metal coupling to provide fluid communication into said passageway, and to allow interconnection of said subsystem to upstream components of an exhaust assembly.

11. The exhaust subsystem of claim 1, wherein said apertures are substantially rectangular and are formed at regular intervals along said liner.

12. The exhaust subsystem of claim 1, wherein said fiber insulating layer comprises at least one of glass fiber and mineral fiber.

13. The exhaust subsystem of claim 1, wherein said fiber insulating layer is sufficiently thick to prevent the said polymer material from degrading due to heat of said gases.

14. The exhaust subsystem of claim 1, wherein each of said voids is defined by outwardly extending ribs, extending outwardly from said liner toward said exterior pipe and formed from said liner.

15. The exhaust subsystem of claim 14, wherein each of said ribs is defined by two layers of said liner, folded to project outwardly.

16. The exhaust subsystem of claim 1, wherein said liner is deformed to define each of said grooves as two outwardly extending annular walls.

17. The exhaust subsystem of claim 16, wherein each of said annular walls is defined by two generally sharp folds in said liner.

18. The exhaust subsystem of claim 1, wherein said liner is formed of at least one of stainless steel, and aluminium.

19. The exhaust subsystem of claim 1, wherein said exterior pipe comprises injection molded polymer.

20. The exhaust subsystem of claim 19, wherein said exterior pipe is injection molded as a hinged clam shell.

21. The exhaust subsystem of claim 1, wherein said liner extends substantially along the entire length of said exterior pipe.

22. An exhaust system comprising a volume muffler in flow communication with said exhaust subsystem of claim 1.

23. The exhaust system of claim 22, wherein said volume muffler comprises an outer shell formed of polymer.

24. The exhaust system of claim 22, wherein said volume muffler comprises a catalytic converter.

25. An exhaust subsystem comprising:
   an exterior pipe comprising polymer, defining an exhaust passage along a length of said exterior pipe, for carrying gases from an engine;
   a rigid liner within said exterior pipe, extending along said length, defining a passageway having a periphery;
   a fiber insulating layer formed between said rigid liner and said exterior pipe;
   wherein said liner is formed to define at least one void extending between said liner and said insulating layer, around the periphery of said passageway and extending along said length, said at least one void defining a resonance chamber to attenuate at least one specific frequency emitted by a specific engine;
   wherein said liner comprises a plurality of apertures, allowing sound waves to pass from said exhaust passage into said fiber insulating layer, and into said at least one void.

* * * * *